(No Model.)
S. C. RUPE.
STUMP PULLER.
No. 507,935. Patented Oct. 31, 1893.
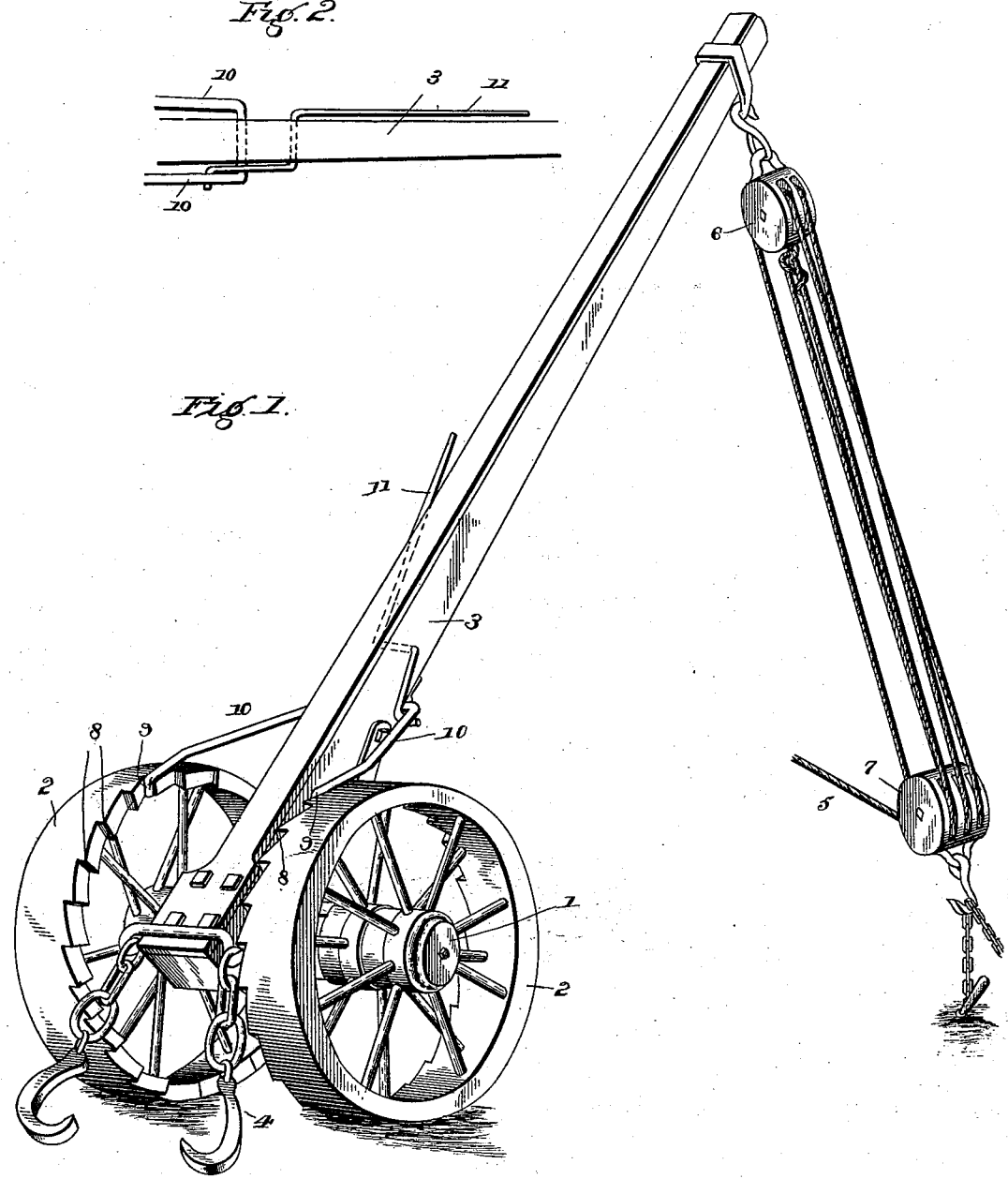
Witnesses
Inventor
Sabathiel C. Rupe

UNITED STATES PATENT OFFICE.

SALATHIEL C. RUPE, OF GARLAND, TEXAS.

STUMP-PULLER.

SPECIFICATION forming part of Letters Patent No. 507,935, dated October 31, 1893.

Application filed May 17, 1893. Serial No. 474,551. (No model.)

*To all whom it may concern:*

Be it known that I, SALATHIEL C. RUPE, a citizen of the United States, residing at Garland, in the county of Dallas and State of Texas, have invented a new and useful Stump-Puller, of which the following is a specification.

The invention relates to improvements in stump-pullers.

The object of the present invention is to improve the construction of stump pullers, and to provide a simple and effective one, which will exert a great amount of power on a stump, and which will draw the latter entirely free from the ground.

The invention consists in the construction and novel combination and arrangement of parts hereinafter fully described, illustrated in the accompanying drawings and pointed out in the claim hereto appended.

In the drawings—Figure 1 is a perspective view of a stump puller constructed in accordance with this invention. Fig. 2 is a detail view of a portion of the beam showing the lever.

Like numerals of reference indicate corresponding parts in both the figures of the drawings.

1 designates an axle having journaled on it carrying wheels 2, and having secured to it at its center a beam 3, which projects rearwardly from the axle and has attached to it a grapple 4. The beam is adapted to be raised at an inclination to lower its rear end to enable the grapple to be secured to a stump, and the beam is then drawn by a horizontal draft rope 5, which is laced through upper and lower pulley blocks 6 and 7. The upper pulley block is a double one, and the lower one 7 has three pulleys, and by this means the power of the draft rope is greatly increased. The upper pulley block is attached by a hook to the front end of the beam, and the lower one is suitably anchored, and a draft animal is attached to the draft rope. In order to increase the distance which the rear end of the beam moves to enable it to travel a sufficient distance to free the stump entirely from the ground, the stump puller is caused to travel forward as the stump is being drawn from the ground. The wheels are provided at the inner edges of the rims or tires with ratchet teeth 8, which are engaged by hooks 9 of rods 10, extending rearward from the beam. The rods are preferably formed integral with each other, and are hinged to the lower face of the beam, and when the stump puller is not operating on a stump and is being moved from one place to another, the rods are held out of engagement with the ratchet teeth by a lever 11, which is fulcrumed on the beam, and has its rear end bent at an angle and engaging one of the rods. The lever extends along the beam, and is provided with a bend which passes through the beam and forms a pivot for the lever. As the beam is raised the hooks of the rods engage successively the teeth, and as the beam is lowered the hooks cause the wheels to move forward and partially rotate. The rods 10 have their rear ends bent downward to form the hooks 9, and they are resilient and spring outward to carry the hooks in engagement with the ratchet teeth which are formed on the rims of the wheels at the inner edges thereof. The lever 11 readily lifts the rods out of engagement with the ratchet teeth.

It will be seen that the stump puller is simple in construction, that it is effective in operation and capable of exerting great power on the stump, and that it is adapted for lifting the stump free from the ground.

Changes in the form, proportion and the minor details of construction may be resorted to without departing from the principle or sacrificing any of the advantages of this invention.

What I claim is—

A stump puller comprising an axle, a beam secured to the axle, a grapple attached to the beam, wheels journaled on the axle and provided at the inner edges of their rims with ratchet teeth, resilient outwardly springing rods hinged at their front ends to the beam and extending rearward between the wheels and provided with depending hooks to engage the ratchet teeth, and a lever disposed longitudinally of the beam and fulcrumed thereon and having its rear end engaging one of the rods and adapted to lift the hooks thereof out of engagement with the ratchet teeth, substantially as described.

In testimony that I claim the foregoing as my own I have hereto affixed my signature in the presence of two witnesses.

SALATHIEL C. ×̇ RUPE.
<br>his<br>mark

Witnesses:
JOHN WOLFORD,
J. W. ROBERTS.